July 1, 1941. S. Z. SOSTRIN ET AL 2,247,968
ARTIFICIAL TOOTH
Filed Dec. 8, 1939
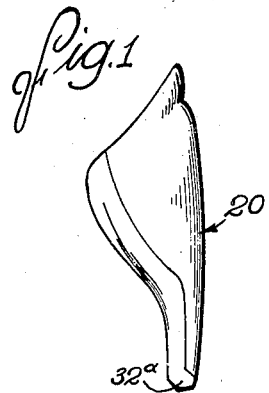
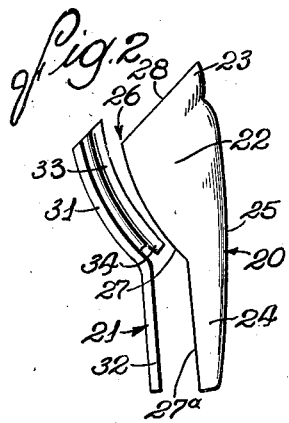
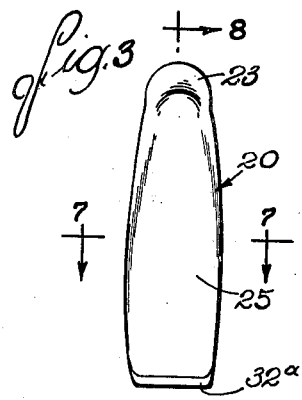
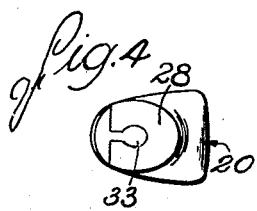
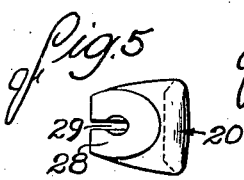
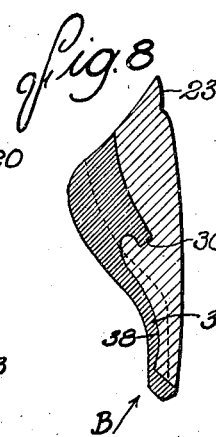
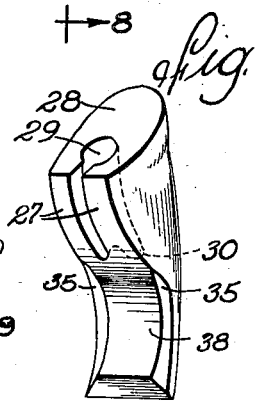
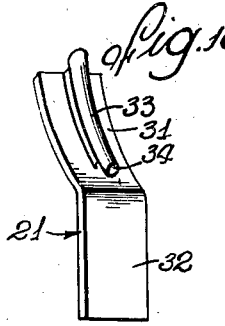
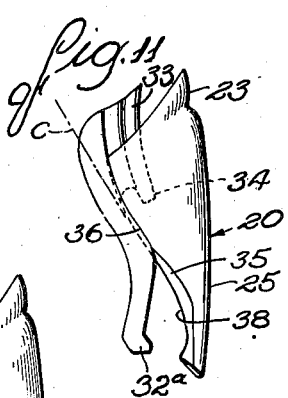
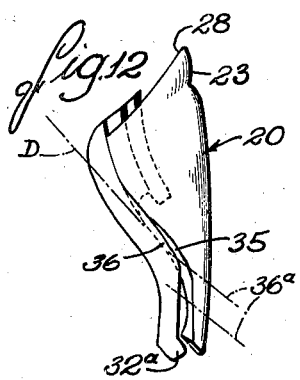
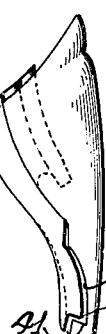
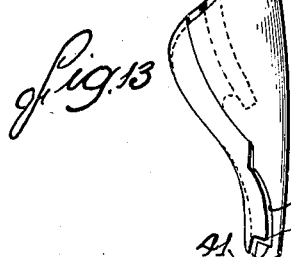
INVENTORS
Samuel Z. Sostrin
Cyril J. Dembicki
By Parker, Carlson, Pitzner & Hubbard
ATTORNEYS Patented July 1, 1941

2,247,968

UNITED STATES PATENT OFFICE 2,247,968

ARTIFICIAL TOOTH

Samuel Z. Sostrin and Cyril J. Dembicki, Chicago, Ill., assignors to W. M. Alexander, trustee, Chicago, Ill.

Application December 8, 1939, Serial No. 308,112

3 Claims. (Cl. 32—12)

The invention relates to an artificial tooth structure and has as its general aim the provision of a novel structure of this class which is strong and affords an unusual degree of protection to the procelain facing and in which the facing may be trimmed practically to any desired extent without materially weakening the structure.

Another object of the invention is to provide a new and improved artificial tooth structure which allows the body and edges of the porcelain facing to be protected by the metal backing to the extent desired yet permits the removal of the facing when necessary without injury to the gum tissue or damage to the backing.

Other objects and advantages will become apparent in the following description and from the accompanying drawing, in which:

Figure 1 is a side view of an exemplary and completed artificial tooth structure embodying the features of the invention.

Fig. 2 illustrates in disassembled relation a porcelain facing and backing prior to trimming or working by the technician.

Fig. 3 is a view looking toward the facing side of the tooth shown in Fig. 1.

Fig. 4 is a top view of the tooth shown in Fig. 1.

Figs. 5 and 6 are top views of the facing and backing plate respectively.

Fig. 7 is a sectional view taken along the line 7—7 of Fig. 3.

Fig. 8 is a longitudinal sectional view taken along the line 8—8 of Fig. 3.

Fig. 9 is a perspective view of the facing looking primarily toward the plate-engaging side thereof.

Fig. 10 is a perspective view of the backing plate.

Figs. 11 and 12 are views illustrating different relative positions of the facing and backing during assembly.

Fig. 13 is a view similar to Fig. 12 but illustrating a different form of completed tooth structure.

While the invention is susceptible of various modifications and alternative constructions, we have shown in the drawing and will herein describe in detail the preferred embodiment, but it is to be understood that we do not thereby intend to limit the invention to the specific form disclosed, but intend to cover all modifications and alternative constructions falling within the spirit and scope of the invention as expressed in the appended claims.

Referring to the exemplary form of artificial tooth structure which has been selected to illustrate the invention, the numerals 20 and 21 (Fig. 2) respectively, designate the facing and backing plate of an artificial upper incisor as supplied to the technician and from which many forms, shapes and sizes of teeth may be conveniently produced. The invention is of especial value in this regard since the basic structure is susceptible of many more variations than is possible with those heretofore known and used. After the facing has been trimmed and the backing plate built up and assembled in a suitable denture, the parts are secured together as by locking elements hereinafter described.

The facing 20 is usually formed of porcelain or like material and may, for convenience in description, be considered as comprising a central body portion 22 which is roughly triangular when viewed from the side (as in Fig. 2) and has a pair of opposite extensions on the labial side of the body of which the extension designated 23 will be termed the gingival section and that indicated at 24 the incisal or occlusal section. The facing has a labial or buccal face 25, defined by the two sections and the long outer side of the body portion, the opposite side 26 of the facing being adapted for engagement by the supporting backing. The body portion 22 forms a projection on the side 26 and the triangular shape thereof provides an elongated surface 27, which slopes gradually toward a junction with a plane surface 27$^a$ on the incisal or occlusal section 24, and a shorter surface 28 directed more abruptly toward the gingival section. The section 24 is relatively thin and the surface 27$^a$ substantially parallels the longitudinal plane of the facing.

In the exemplary facing the elongated surface 27 extends at an acute angle to the front plane or labial face 25 of the facing, or at a wide obtuse angle to the plane surface 27$^a$, to dispose the surface 27 substantially, although not necessarily exactly, transverse of the direction of the line of bite or, more properly, of the direction of the forces resulting from the biting action. This surface 27 is preferably formed as an arc of relatively large radius. An undercut groove 29 (Figs. 5 and 9), which also is preferably arcuate longitudinally, extends substantially centrally of the length of the surface 27 and may, if desired, terminate in an end pocket 30 (Fig. 8).

The width and length of the facing 20, as well as the shape and conformation of the gingival and incisal or occlusal sections, depend generally on the dimensions of the teeth with which the facing is to be matched and on the nature of the tooth it replaces in the mouth. The present structure, however, is so well adapted to permit shaping thereof to meet a wide range of conditions that only a few sizes of a single standardized structure will enable an operator to produce substantially any tooth form required.

The backing plate 21 may, for example, be made of gold alloy. It is fashioned for abutment with the side 27 of the body portion 22 by an arcuate part 31 and with the corresponding side of the incisal section by a flat part 32. The arcuate plate part 31 carries a substantially centrally located rib or rail 33 having a shape complemental to that of the groove 29 and having an end 34 projecting beyond the arcuate plate part to seat, in assembly, in the pocket 30 in the facing. The backing plate may be of any desired width from a dimension corresponding to the width of the facing to, in some instances, an omission thereof entirely. It is preferred, however, that a plate be used to provide at least a narrow flange along each side of the rail to avoid casting difficulties. The rib or rail has been illustrated as being of cylindrical cross section, but it will be understood that any type of undercut relationship that will prevent other than relative endwise movement of the rib and facing may be employed.

The angularity of the interfitting portions of the facing 20 and backing plate 21 is important. The acuate angularity of the body surface 27 to the labial face of the tooth produces a structure which is assembled by a movement of the facing which is primarily in a gingival direction but is also in a lingual direction. In general, the line of relative movement of the facing and backing is indicated by the dotted line C in Fig. 11. The line, as shown, extends at an acute angle to the flat plane of the tooth and in a direction which is on the labial side of the tooth at the incisal or occlusal and is lingual of the tooth at the gingival. The arcuate curvature changes the line of movement gradually so that when the facing and backing are nearly seated the line of movement has a slight angular displacement from that which it has initially. This line of movement is indicated generally by the dotted line D in Fig. 12 and causes the parts to move into or out of seated relation in a more nearly straight line direction. The facing 20 can, therefore, be assembled with or removed from the backing plate 21 without danger that the gum tissue will in any manner be injured or disturbed. Moreover, this direction of movement is most convenient for the dentist. Correlated with this advantage is the further feature that the surface 27 is disposed generally transversely of the usual direction of bite; that is to say, of the direction (indicated by the arrow B, Fig. 8) in which the opposed mating tooth moves into engagement with the artificial tooth. Thus, stresses resulting from use which tend to cause separation of the plate 21 and facing 20 are opposed by a transverse abutment which permits the connecting parts to be relatively short without weakening the union. Where the abutting parts are arcuate, the stresses will be similarly opposed and in any event the union will be stronger and more capable of withstanding the forces to which it will be subjected than one in which the union is in a plane parallel to the labial face of the tooth.

The present facing and backing arrangement enables an operator to change the basic structure in many ways to adapt it for the various conditions that may be encountered. Starting, for example, with the structure shown in Fig. 2, the backing plate may be built up by adding additional metal thereto. The width of the facing may be reduced as desired and the sides of the facing may be cut away, as indicated at 35 (Fig. 9), mesially and distally to receive strengthening overhanging flanges 36 (Figs. 6 and 7) formed on the backing. Such flanges will not be visible in an assembled denture. The end of the incisal section may be trimmed, usually along a plane generally indicated by the dotted lines 36$^a$ (Fig. 12), as far as the lines of the arcuate surface 27 and the backing provided with a lip 32$^a$ which protectively overhangs the incisal edge of the facing. The ends of the incisal or the gingival sections may be cut away endwise or transversely as required to meet substantially any condition that may be encountered in practice without weakening the strength of the facing or the security of its union with the backing. Thus, the facing may be ground away to decrease its length; the labial face may be cut or trimmed; and it may be otherwise fashioned to coact with a backing formation of any character. Since only a relatively short length of rail and groove engagement will hold the parts securely together, the extent of permissible trimming is nearly unlimited. The thick and sturdy body portion 22 spaces the groove a substantial distance from the labial surface of the facing and permits this surface to be trimmed substantially without weakening the facing. Moreover, in instances of irregular bites, requiring additional thickness on the backing at the incisal, the plane surface 27$^a$ of the facing may be recessed, as indicated at 38 (Fig. 8), and the backing complementarily built-up, as at 39, without materially weakening the facing. This trimming may be carried to such extreme cases as that shown in Fig. 13, wherein the facing has been deeply cut away, as at 40, almost to the incisal and an undercut recess 41 formed therein opening away from the incisal. The backing will be of complemental shape including a lip 42 near the incisal of the backing for interfitting engagement with the recess 41. The angularity of the undercut is such as to permit the lip to seat in the recess during the final increment of assembling movement of the facing and backing.

Thus, various artificial tooth forms, of which only a few representative types have been shown, may be developed from the structure shown in Fig. 2. The heavy body portion 22 of the facing, the angularity of the surface 27 with respect to the plane of the facing and to the line of bite cooperate in affording heretofore unknown wide latitude to the technician in his development of a tooth from a basic structure. In the various forms of completed tooth structures having a built-up overhang of the backing at the incisal edge, along the sides, or over the gingival end, removal of the facing may be readily accomplished since the facing swings relatively to the backing outwardly and incisally. The arcuate relationship of the mating elements and their angularity to the face plane of the structure causes the initial separating movement of the facing to be away from the backing which prevents binding by the overhanging parts of the backing. The rocking movement, being about the gingival end of the facing, as approximate center, insures that the gum tissue will not be injured during insertion or removal of the facing.

We claim as our invention:

1. In an artificial tooth structure, the combination of a facing having an elongated body similar in shape to that of a normal natural anterior tooth and including an incisal end portion having a lingual surface substantially paralleling the longitudinal face plane of the facing and a portion located gingivally of said incisal end portion of gradually increasing labio-lingual thickness, the increased mass of said portion being located on the lingual side of said facing and provided with a lingual face arcuate along the direction of increasing thickness, said portion of increasing thickness having a groove of uniform cross sectional dimensions traversing the lingual face thereof in a longitudinal direction from the gingival end of said last mentioned portion, and backing means including a rail complemental in shape to that of said groove.

2. In a facing for an artificial tooth structure, an elongated body similar in shape to that of a normal natural anterior tooth and having an incisal portion of substantial mass and length whereby it may be trimmed and cut away to simulate the changes that occur in a natural tooth, said facing having a portion gingivally adjoining said incisal portion of gradually increasing thickness forming a lingual projection with a lingual face gently inclined with respect to the plane of said incisal portion, said lingual face having a longitudinally extending securing groove therein terminating in a closed end adjacent to the incisal portion.

3. In an artificial tooth structure of the character described, the combination of a facing body elongated in an incisal-gingival direction, said body including an incisal portion having a substantially flat-plane lingual face and having a substantial labio-lingual thickness capable of being trimmed or lingually recessed for the accommodation of the backing in insuring incisal protection under various conditions, said body including an intermediate portion having a labio-lingual thickness which increases gradually from said flat-plane lingual face to provide a lingual face on said intermediate portion related to said flat-plane lingual face at a wide obtuse angle, the lingual face on said intermediate portion having an undercut groove therein extending longitudinally toward the incisal end of the structure and paralleling the lingual face of said intermediate portion.

SAMUEL Z. SOSTRIN.
CYRIL J. DEMBICKI.